(12) United States Patent
Armstrong et al.

(10) Patent No.: US 8,541,909 B2
(45) Date of Patent: Sep. 24, 2013

(54) SYSTEM HAVING A VARIABLE FREQUENCY POWER DISTRIBUTION BUS FOR DRIVING A VARIABLE SPEED MOTOR

(75) Inventors: Richard Armstrong, Princeton, MA (US); Edgar Thaxton, Groton, MA (US)

(73) Assignee: DRS Power Technology, Inc., Fitchburg, MA (US)

( * ) Notice: Subject to any disclaimer, the term of this patent is extended or adjusted under 35 U.S.C. 154(b) by 0 days.

(21) Appl. No.: 13/169,883

(22) Filed: Jun. 27, 2011

(65) Prior Publication Data
US 2011/0254492 A1    Oct. 20, 2011

Related U.S. Application Data

(63) Continuation of application No. 12/354,146, filed on Jan. 15, 2009, now Pat. No. 7,969,044.

(60) Provisional application No. 61/021,754, filed on Jan. 17, 2008.

(51) Int. Cl.
*H02J 3/38* (2006.01)
*H02P 9/00* (2006.01)

(52) U.S. Cl.
USPC .............. 307/86; 307/44; 307/47; 307/68; 307/84; 307/85; 322/44; 322/89

(58) Field of Classification Search
USPC ............... 307/44, 47, 68, 84, 85, 86; 322/44; 322/89
See application file for complete search history.

(56) References Cited

U.S. PATENT DOCUMENTS

| | | | |
|---|---|---|---|
| 1,390,624 A | 9/1921 | Lammes | |
| 1,417,342 A | 5/1922 | Martin et al. | |
| 2,163,140 A | 6/1939 | Coleman et al. | |
| 4,661,714 A | 4/1987 | Satterthwaite et al. | |
| 4,868,406 A | 9/1989 | Glennon et al. | |
| 5,199,912 A | 4/1993 | Date et al. | |
| 5,684,690 A | 11/1997 | Levedahl | |
| 5,764,502 A | 6/1998 | Morgan et al. | |
| 6,150,731 A | 11/2000 | Rinaldi et al. | |
| 6,175,163 B1 | 1/2001 | Rinaldi et al. | |
| 6,188,139 B1 | 2/2001 | Thaxton et al. | |
| 6,339,309 B1 * | 1/2002 | Bixel et al. | 318/727 |
| 6,957,990 B2 | 10/2005 | Lowe | |
| 7,121,905 B2 | 10/2006 | Rzadki | |
| 7,219,673 B2 | 5/2007 | Lemak | |
| 7,692,335 B2 | 4/2010 | Michalko | |

* cited by examiner

*Primary Examiner* — Hal Kaplan
(74) *Attorney, Agent, or Firm* — Kilpatrick Townsend & Stockton LLP

(57) ABSTRACT

A system and method for supplying power to a variable speed motor for rotating a shaft may include generating an A/C output having a variable frequency corresponding to speed of a prime mover, where the speed of the prime mover is equal to or greater than a predetermined speed limit. The A/C output of the prime mover may be distributed to the variable speed motor such that the speed of the variable speed motor is varied relative to the frequency of the A/C output. The variable speed motor may be electrically disconnected from the A/C power when the speed of the prime mover being used to drive the variable speed motor is equal to or within a predetermined range of the predetermined speed limit. An alternate A/C output may be distributed to the variable speed motor after the A/C power is electrically disconnected from the variable speed motor.

19 Claims, 2 Drawing Sheets

US 8,541,909 B2

SYSTEM HAVING A VARIABLE FREQUENCY POWER DISTRIBUTION BUS FOR DRIVING A VARIABLE SPEED MOTOR

CROSS-REFERENCE TO RELATED APPLICATIONS

This application is a Continuation of U.S. patent application Ser. No. 12/354,146 filed on Jan. 15, 2009, issuing as U.S. Pat. No. 7,969,044 on Jun. 28, 2011, which claims the benefit of the filing date of U.S. Provisional Applications No. 61/021,754, titled "A System Having A Variable Frequency Power Distribution Bus For Driving A Variable Speed Motor," filed on Jan. 17, 2008, which is incorporated herein by reference to the extent permitted by law.

FIELD OF THE INVENTION

The present invention relates to power distribution systems, more particularly, to a system having a variable frequency power distribution bus for driving a variable speed motor.

BACKGROUND OF THE INVENTION

Conventional power distribution systems for ships or other vehicles typically employ one or more prime movers (such as a steam turbine or diesel engine used to drive an electric generator or alternator) to provide a single frequency power supply current on a bus for powering and controlling variable speed motors to operate a propeller in association with supplying auxiliary power to other ship loads (e.g., a single frequency A/C input pump, blower, lamp, or other electrical A/C and D/C loads). In certain conventional power distribution systems for ships or other vehicles, the auxiliary loads and main propulsion loads may be driven by separate prime movers or generators via separate power distribution busses. Thus, in such conventional power distribution systems, the auxiliary loads and main propulsion loads are not electrically connected to each other via the same power distribution bus.

A conventional electrical power distribution system 10 for a ship, as shown in FIG. 1, typically employs multiple generators 12a-12d to source a single frequency, single voltage power distribution bus 14. To operate the ship's propeller 16, two variable, high speed motors 18a-18b capable of rotating a rotor shaft 20 within 0-600 RPM are typically coupled to the propeller 16 through a speed reducing gear box 22. Since the conventional power distribution bus 14 only supplies a single frequency and voltage, two conventional high power (e.g., 1000 kW output or more), variable frequency drives (VFDs) 24a-24b are required to supply the variable frequency input needed to operate the two high power, variable speed motors 18a-18b at a range of speeds. Accordingly, as shown in FIG. 1, VFDs 24a-24b are commonly coupled between the single frequency, single voltage power distribution bus 14 (usually via a respective transformer 26a-26b) and the variable, high speed motors 18a-18b. Other auxiliary loads 28a-28h (such as a ballast pump or a blower motor) that require only a single frequency and voltage power input (as opposed to the variable frequency and voltage input required by the motors 18a-18b) are typically coupled either directly to the single frequency, single voltage power distribution bus 14 or via a step down transformer 30a-30b.

The high power VFDs 24a-24b required to operate the variable speed motors and, thus, the speed of the propeller, are often expensive and increase the power consumption and overall costs of the conventional power distribution system 10.

Certain older conventional oil tankers, such as the T2-SE-A1 tanker built in circa 1940 by the Sun Shipbuilding Company, employed a steam turbine driven alternator to power and control a 2300 volt 3 phase synchronous/induction electric motor that was directly coupled to the tanker's propeller shaft. A separate 75 kw 110 volt dc generator was required to provide a 110-volt dc excitation to the motor's rotor for synchronous mode operation. This motor normally operated in synchronous mode when the motor was started and running at a non-idle speed in step with the turbine driven alternator. However, to start and run up this motor, it was necessary to place the motor in induction mode. This was achieved by short-circuiting the motor's rotor slip rings, which normally carried the 110-volt dc excitation current to the motor's rotor windings. As soon as the motor got up to speed, which was observed by ammeters falling back, the short circuit was removed and the 110-volt dc excitation current applied to the motor's rotor slip rings to transition to synchronous mode. A person at the motor controls carried out this operation manually. Auxiliary power for other loads on this conventional tanker was provided by a separate steam turbine driven 400 kw, 440 volt 3 phase alternator. Thus, this older conventional oil tanker required separate power distribution busses for the main propeller motor and other ship loads.

Therefore, there is a need for a common power distribution bus that overcomes the problems noted above and others previously experienced for supplying power and controlling a variable speed motor to operate a propeller shaft or other variable speed load while avoiding the inefficiencies and costs of using variable frequency converters between the prime movers and the loads.

SUMMARY OF THE INVENTION

Systems and articles of manufacture consistent with the present invention provide a power distribution system for a ship or other vehicle or platform having a variable speed motor for operating a shaft, such as a propeller. The power distribution system comprises a variable speed prime mover adapted to generate an A/C output having a variable frequency corresponding to the speed of the prime mover. The speed of the prime mover is equal to or greater than a predetermined speed limit (e.g., idling speed). The power distribution system also includes a power switch and a power distribution bus connected to the A/C output of the prime mover and connected, via the power switch, to the variable speed motor such that the speed of the motor is varied relative to the frequency of the A/C output. The power switch is adapted to disconnect the variable speed motor from the bus when the speed of the prime mover is equal to or within a predetermined range of the predetermined speed limit. The power distribution system further includes a variable frequency drive operatively connected to the A/C output of the prime mover via the power distribution bus and operatively configured to provide an alternate A/C output to the motor after the variable speed motor is disconnected from the power distribution bus. The variable frequency drive may be connected to the motor in parallel with the prime mover via the power distribution bus.

One embodiment of a method for supplying power to a variable speed motor for rotating a shaft may include generating an A/C output having a variable frequency corresponding to speed of a prime mover, where the speed of the prime mover is equal to or greater than a predetermined speed limit.

The A/C output of the prime mover may be distributed to the variable speed motor such that the speed of the variable speed motor is varied relative to the frequency of the A/C output. The variable speed motor may be electrically disconnected from the A/C power when the speed of the prime mover being used to drive the variable speed motor is equal to or within a predetermined range of the predetermined speed limit. An alternate A/C output may be distributed to the variable speed motor after the A/C power is electrically disconnected from the variable speed motor.

One embodiment of a method for supplying power to a variable speed motor for rotating a shaft may include generating multiple A/C outputs having respective variable frequencies corresponding to the speed of the respective prime mover, where the speed of each of the prime movers are equal to or greater than a predetermined speed limit. Speed of the variable speed motor may be selectively varied relative to the frequency of the combined A/C outputs of the prime movers. The variable speed motor may be electrically disconnected when the speed of a prime mover being used to drive the variable speed motor is equal to or within a first predetermined range of the predetermined speed limit. An alternate A/C output may be distributed to the variable speed motor after the variable speed motor is disconnected.

One embodiment of a method of manufacturing a power distribution system for supplying power to a variable speed motor for rotating a shaft may include providing a variable speed prime mover adapted to generate an A/C output having a variable frequency corresponding to the speed of the prime mover. A power switch may be electrically connected to the variable speed prime mover. A power distribution bus may be electrically connected to the A/C output of the prime mover and, via the power switch, to the variable speed motor. A variable frequency drive may be electrically connected to the A/C output of the prime mover via the power distribution bus.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION OF THE INVENTION

Reference will now be made in detail to an implementation in accordance with methods, systems, and products consistent with the present invention as illustrated in the accompanying drawings.

Figure 1:
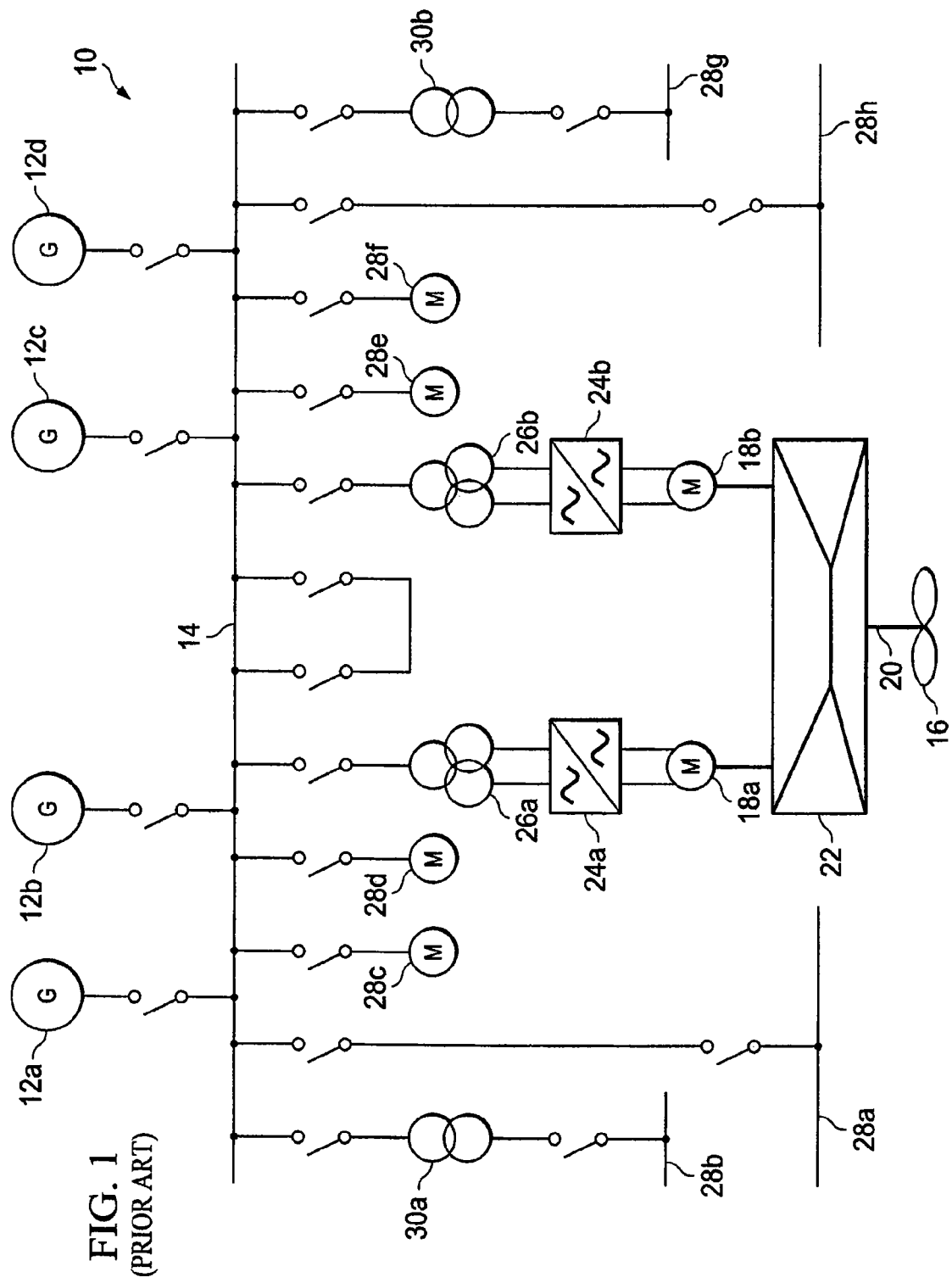
FIG. 1 is a block diagram of a conventional power distribution system for a ship, in which multiple prime movers provide a single frequency power supply current on a bus for powering and controlling (via respective VFD units) variable speed motors to operate a propeller in association with supplying auxiliary power to other ship loads.
Figure 2:
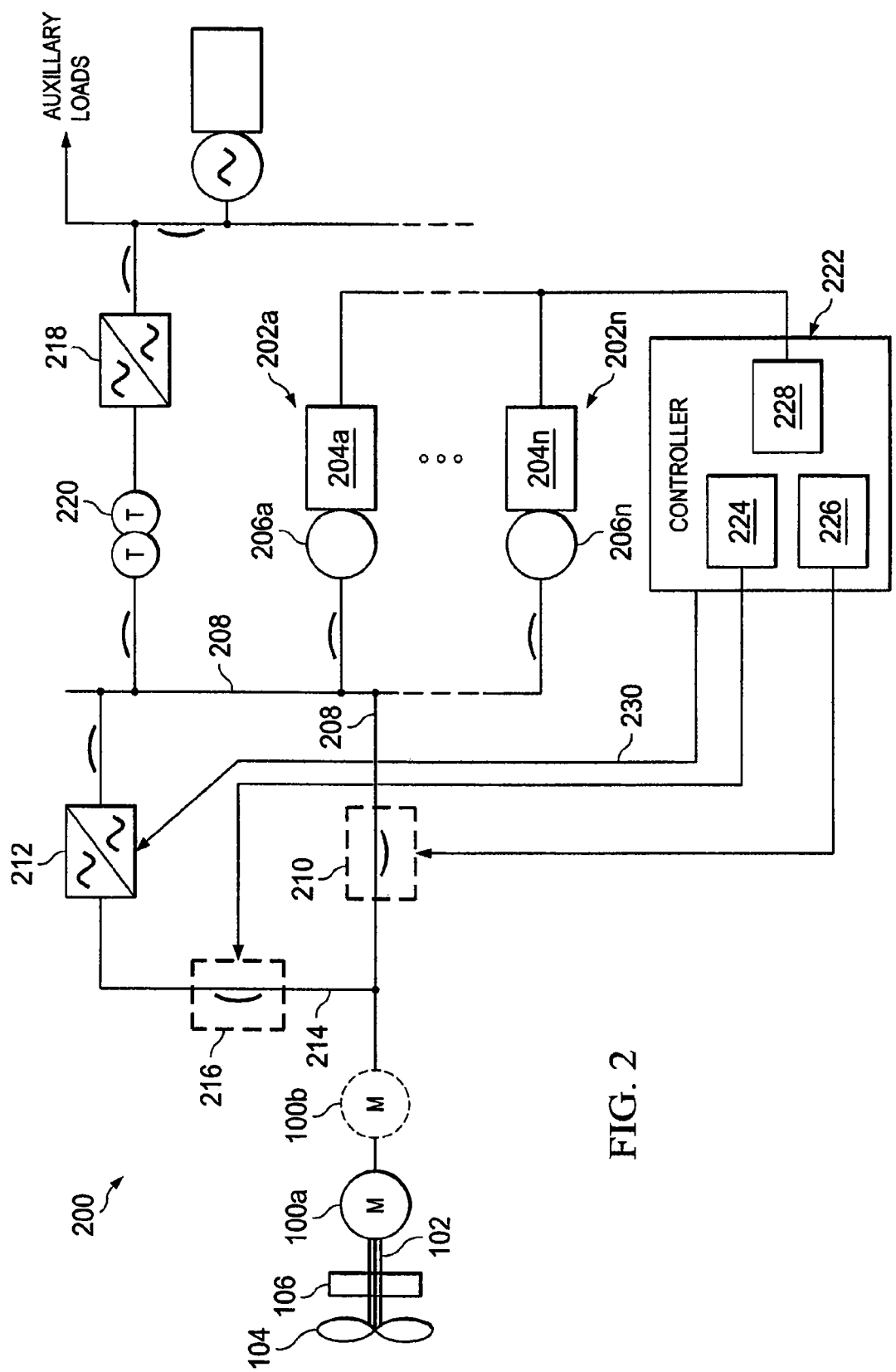
FIG. 2 is a block diagram depicting an exemplary power distribution system for a ship consistent with the present invention.

FIG. 2 is a block diagram depicting an exemplary power distribution system 200 for a ship consistent with the present invention. The power distribution system 200 supplies power to and controls the speed of one or more variable speed motors 100a and 100b for driving or rotating a shaft 102 and operating a primary load, such as a propeller 104, that is coupled to the shaft 102. A conventional gear box 106 may be employed to couple the propeller 104 to the shaft 102 driven by the motor 100a and/or 100b. Each motor 100a and 100b may be a synchronous motor, an induction motor, a permanent magnet motor, or any other type of variable speed, electric motor that generates a mechanical rotary or linear force for rotating the shaft 102 at a speed corresponding to an A/C input to the motor 100a and 100b.

Note the second motor 100b is shown in dashed lines in FIG. 2 to reflect that the second motor 100b is optional and not required to implement the power distribution system 200 in accordance with the present invention. However, should additional torque be required to rotate the shaft 102 to effectively operate the propeller 104, the power distribution system 200 as described herein enables a second motor 100b to be coupled to the shaft 102 in series with the first motor 100a.

Although the power distribution system 200 is shown and described herein for a ship, one of ordinary skill in the art will appreciate (upon review of the present application) that the power distribution system 200 may be suitable for providing power to a variable speed motor used in other applications.

As shown in FIG. 2, the power distribution system 200 comprises one or more variable speed prime movers 202a-202n adapted to generate an A/C output having a variable frequency corresponding to the speed of the respective prime mover 202a-202n. Each prime mover 202a-202n may comprise a steam turbine, diesel engine, or other engine 204a-204n and an electric generator 206a-206n that is driven by the engine to generate the variable frequency A/C output of the respective prime mover 202a-202n. The speed of each prime mover 202a-202n is equal to or greater than a predetermined speed limit associated with the prime mover 202a-202n. When the prime mover 202a is operating at its speed limit or lower end of the prime mover's operating range, the generator 206a generates an A/C output at a frequency (e.g., 20 Hz) corresponding to the speed limit of the prime mover 202a.

As described in further detail below, the power distribution system 200 enables the speed of the motor 100a (or motors 100a-100n) to be varied relative to the speed of the prime movers 202a-202n (and, thus, the frequency of the A/C output of prime movers 202a-202n), when the speed of the prime movers 202a-202n is equal to or greater than the predetermined speed limit of the prime movers 202a-202n. When the prime movers 202a-202n are operated at the predetermined speed limit, the power distribution system 200 switches A/C input to the motor 100a directly from the prime movers 202a-202n to a low power variable frequency drive (e.g., 212 in FIG. 2) to provide idle speed control for the motor 100a.

As shown in FIG. 2, the power distribution system 200 includes a power distribution bus 208 that is connected to the A/C output of each prime mover 202a-202n and connected, via a power switch 210, to the variable speed motor 100a such that the speed of the motor 100a (and/or 100b) is varied relative to the frequency of the A/C output of a respective prime mover (e.g., 202a) or the combined A/C output of the prime movers 202a-202n. The power switch 210 may be a circuit breaker switch or other switch that may be selectively actuated to disconnect the motor 100a (or motors 100a and 100b) from the power distribution bus 208. The power switch 210 is adapted to disconnect the variable speed motor or motors 100a-100n from the bus 208 when the speed of the prime mover is equal to or within a predetermined range (such as 0 to 2 rpms) of the predetermined speed limit.

To control each motor 100a and 100b after the prime movers 202a-202n reach their respective predetermined speed limit, the power distribution system 200 includes a variable frequency drive 212 that is operatively connected to the A/C output of the prime movers 202a-202n via the power distribution bus 208 and operatively configured to provide an alternate A/C output to the motor (via a separate bus 214) after the variable speed motor 100a is (or motors 100a and 100b are) disconnected from the power distribution bus 208. Accordingly, the variable frequency drive 212 is operatively configured to provide the alternate A/C output to the motor 100a when the speed of the prime mover 202a-202n is less than the predetermined speed limit at which time the power switch 210 is actuated to disconnect the motor 100a from the bus 208. The variable frequency drive 212 may be a standard motor drive that may be configured or selectively controlled to provide a variable A/C output within a predetermined range of frequencies (e.g., 0 to 60 Hz) based on a substantially fixed A/C input (e.g., 60 Hz+/−2 Hz).

The power distribution system 200 may also include a second power switch 216 adapted to connect the alternate A/C output of the variable frequency drive 212 to the motor 100a when or after the speed of the prime mover 202a-202n is less than the predetermined speed limit of the prime mover 202a-202n. The power switch 216 may be a circuit breaker switch or other switch that may be selectively actuated to disconnect the A/C output of the frequency drive 212 from the motor 100a or the separate bus 214. In one implementation, the second power switch 216 is incorporated into the variable frequency drive 212.

The power distribution system 200 may further comprise a second variable frequency drive 218 operatively connected to the A/C output of the prime mover 202a-202n via the power distribution bus 208 and operatively configured to generate a single frequency A/C output (e.g., 60 Hz) based on the variable frequency A/C output of the prime mover 202a-202n. The A/C output of the second variable frequency drive 218 may used to provide power to auxiliary loads (not shown in the figures). As shown in FIG. 2, a transformer 220 may be disposed between the power distribution bus 208 and the second variable frequency drive 218 to step down the A/C voltage on the bus 208 to the drive 218.

The power distribution system 200 may also include a prime mover controller 222 operatively connected to each prime mover 202a-202n and operatively configured to selectively vary the speed of each prime mover 202a-202n in unison. In one implementation, the controller 222 may include a user adjustable mechanical link (not shown in Figures) connected to each prime mover 202a-202n to adjust the pole arrangement of the respective prime mover 202a-202n to correspondingly adjust the speed and A/C frequency output of the prime mover 202a-202n The controller 222 is adapted to determine or sense when the prime movers 202a-202n each have reached or is within a predetermined range (e.g., 0 to 2 rpm) of their respective speed limit and, in response, actuate the first power switch 210 to disconnect the motor 100a from the power distribution bus 208 and allow the variable frequency drive 212 to provide the alternate A/C output to the motor 100a. In one implementation, when or after the first power switch 210 is actuated to remove the motor 100a from the power distribution bus 208, the controller 222 is operatively configured to actuate the second power switch 216 to connect the A/C output of the variable frequency drive 212 to the A/C input of the motor 100a. When the speed of each of the prime movers 202a-202n is adjusted via the controller 222 to be greater than the predetermined speed limit of the respective prime movers 202a-202n, the controller 222 de-actuates the second power switch 216 to disconnect the A/C output of the variable frequency drive 212 to the A/C input of the motor 100a and re-actuates the first power switch 216 to reconnect the A/C output of the variable frequency drive 212 to the power distribution bus 208.

The controller 222 may include D/A converters 224 and 226 for providing the actuation/de-actuation signals to the power switches 210 and 216. The controller 222 may also include may comprise an I/O unit 228 that has a plurality of A/D converters for providing a respective speed control signal to each prime mover 202a-202n in accordance with the present invention. The controller 222 may further provide one or more control signals 230 to the variable frequency drive 212 to control the low or idle speeds (e.g., 0 to 10 rpms) of the motor 100a and 100n in accordance with the present invention. The controller 222 may be implemented in hardware alone (such as ASIC device) or in hardware and software, including a microprocessor and a memory holding a program run by the microprocessor to control the prime movers 202a-202n and the power switches 210 and 216 as described herein.

Accordingly, the power distribution system 200 enables the speed of the prime mover 202a-202n to be selectively varied to correspondingly vary the frequency on the power distribution bus 208 and, in turn, directly control the speed of the variable speed motor 100a while simultaneously providing power (via the second variable frequency drive 218) to auxiliary loads. In addition, when the speed of each prime mover 202a-202n is equal to or within a first predetermined range of the prime mover's predetermined speed limit, the power distribution system 200 disconnects the variable speed motor 100a from the power distribution bus 208 and enables a variable frequency drive 212 that remains connected to the power distribution bus 208 to provide an alternate A/C output to the motor 100a for controlling the motor 100a at low or idle speeds (e.g., 0 to 10 rpms).

The power distribution system 200 with a variable frequency, power distribution bus 208 implemented in accordance with the present invention eliminates the need for the combination of transformers and variable frequency drives required to drive high power, variable speed motors in the conventional power distribution systems, saving cost and improving energy efficiency for the system 200.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A method for supplying power to a variable speed motor for rotating a shaft, comprising:
   generating an A/C output having a variable frequency corresponding to speed of a prime mover, the speed of the prime mover being equal to or greater than a predetermined speed limit;
   distributing the A/C output of the prime mover to the variable speed motor such that the speed of the variable speed motor is varied relative to the frequency of the A/C output;
   electrically disconnecting the variable speed motor from the A/C power when the speed of the prime mover being used to drive the variable speed motor is equal to or within a predetermined range of the predetermined speed limit; and distributing an alternate A/C output to the variable speed motor after the A/C power is electrically disconnected from the variable speed motor.

2. The method according to claim 1, wherein distributing the alternate A/C output includes distributing the alternate A/C output to the variable speed motor when the speed of the prime mover is less than the predetermined speed limit.

3. The method according to claim 1, further connecting the alternate A/C output to the variable speed motor via a different conductive path than a conductive path that delivers the A/C power to the variable speed motor when the speed of the prime mover is less than the predetermined speed limit.

4. The method according to claim 1, further comprising:
generating a single frequency A/C output based on the variable frequency A/C output of the prime mover; and
driving an auxiliary load with the single frequency A/C output.

5. The method according to claim 1, wherein distributing the alternate A/C output to the variable speed motor includes distributing the alternate A/C output in a parallel manner with respect to the A/C output.

6. The method according to claim 5, further comprising:
electrically disconnecting the A/C output from the variable speed motor; and
distributing the alternate A/C output to the variable speed motor after the variable speed motor is disconnected from the A/C output.

7. The method according to claim 1, further comprising distributing the A/C output and alternate A/C output to a second variable speed motor.

8. The method according to claim 1, wherein distributing the A/C output and alternate A/C output to the second variable speed motor includes distributing the A/C output and alternate A/C output to the second variable speed motor in series with the variable speed motor.

9. A method for supplying power to a variable speed motor for rotating a shaft, comprising:
generating a plurality of A/C outputs having respective variable frequencies corresponding to the speed of the respective prime mover, the speed of each of the prime movers being equal to or greater than a predetermined speed limit,
selectively varying speed of the variable speed motor relative to the frequency of the combined A/C outputs of the prime movers;
electrically disconnecting the variable speed motor when the speed of a prime mover being used to drive the variable speed motor is equal to or within a first predetermined range of the predetermined speed limit; and
distributing an alternate A/C output to the variable speed motor after the variable speed motor is disconnected.

10. The method according to claim 9, wherein distributing the alternate A/C output to the variable speed motor includes distributing the alternate A/C output in a parallel manner with respect to the A/C output.

11. The method according to claim 9, further comprising:
electrically disconnecting the A/C output from the variable speed motor; and
distributing the alternate A/C output to the variable speed motor after the variable speed motor is electrically disconnected from the A/C output.

12. The method according to claim 9, further comprising distributing the A/C output and alternate A/C output to a second variable speed motor.

13. The method according to claim 12, wherein distributing the A/C output and alternate A/C output to the second variable speed motor includes distributing the A/C output and alternate A/C output to the second variable speed motor in series with the variable speed motor.

14. The method according to claim 9, further comprising:
generating a single frequency A/C output based on the variable frequency A/C output of the prime mover; and
driving an auxiliary load with the single frequency A/C output.

15. The method according to claim 9, wherein distributing the alternate A/C output includes distributing the alternate A/C output to the variable speed motor when the speed of the prime mover is less than the predetermined speed limit.

16. A method of manufacturing a power distribution system for supplying power to a variable speed motor for rotating a shaft, said method comprising:
providing a variable speed prime mover adapted to generate an A/C output having a variable frequency corresponding to the speed of the prime mover;
electrically connecting a power switch to the variable speed prime mover;
electrically connecting a power distribution bus to the A/C output of the prime mover and, via the power switch, to the variable speed motor;
electrically connecting a variable frequency drive to the A/C output of the prime mover via the power distribution bus; and
electrically connecting a transformer to the power distribution bus; and
electrically connecting a second variable frequency drive to the transformer to provide for driving auxiliary loads.

17. The method according to claim 16, further comprising connecting a controller to the power switch and to the variable frequency drive, the controller, when operated, is configured to selectably engage and disengage the power switch to apply and remove the A/C output from the variable speed motor.

18. The method according to claim 17, further comprising:
electrically connecting a second power switch between the variable frequency drive and the variable speed motor; and
electrically connecting the controller to the second power switch, wherein the controller is configured to engage and disengage the second power switch in a substantially opposite manner to that of the power switch.

19. The method according to claim 16, further comprising connecting a second variable speed motor to the power distribution bus.

* * * * *